Nov. 21, 1939.  W. E. URSCHEL  2,180,567
FRUIT STEMMER
Filed Feb. 25, 1937    5 Sheets-Sheet 4
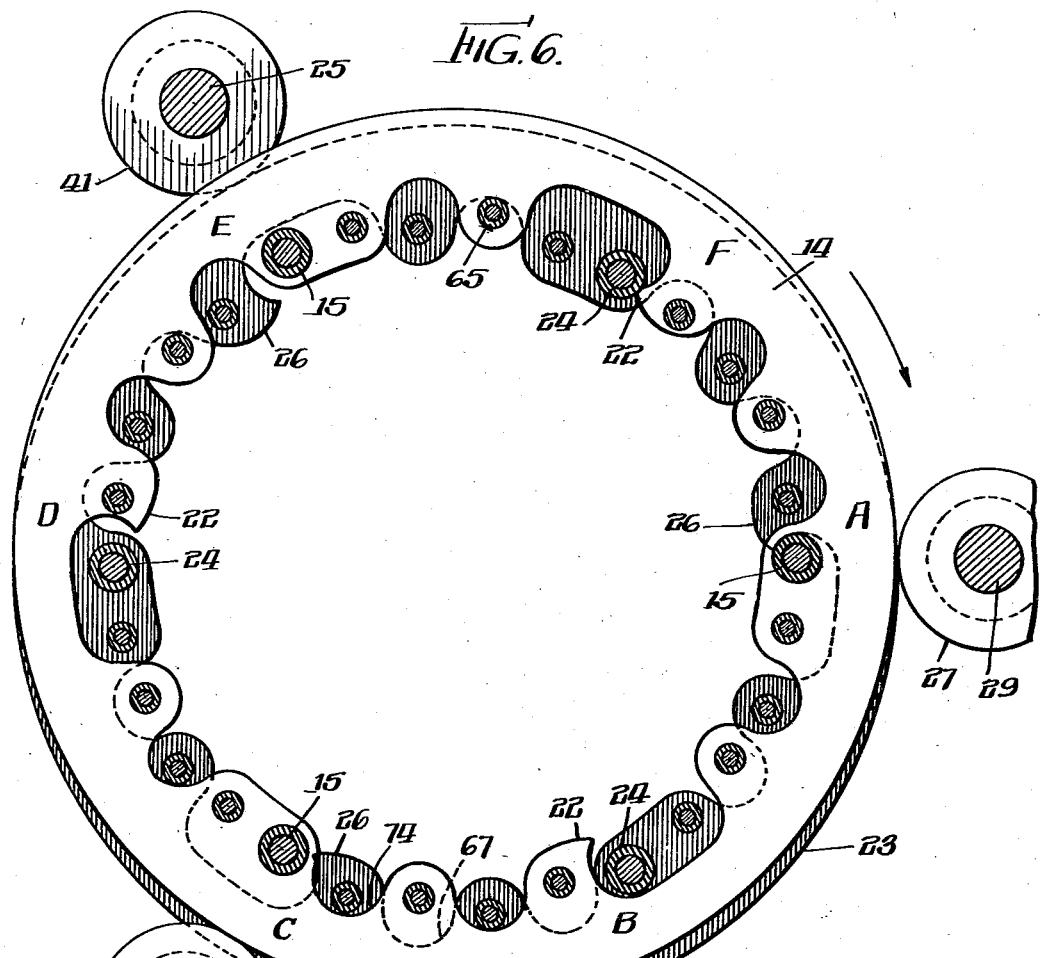
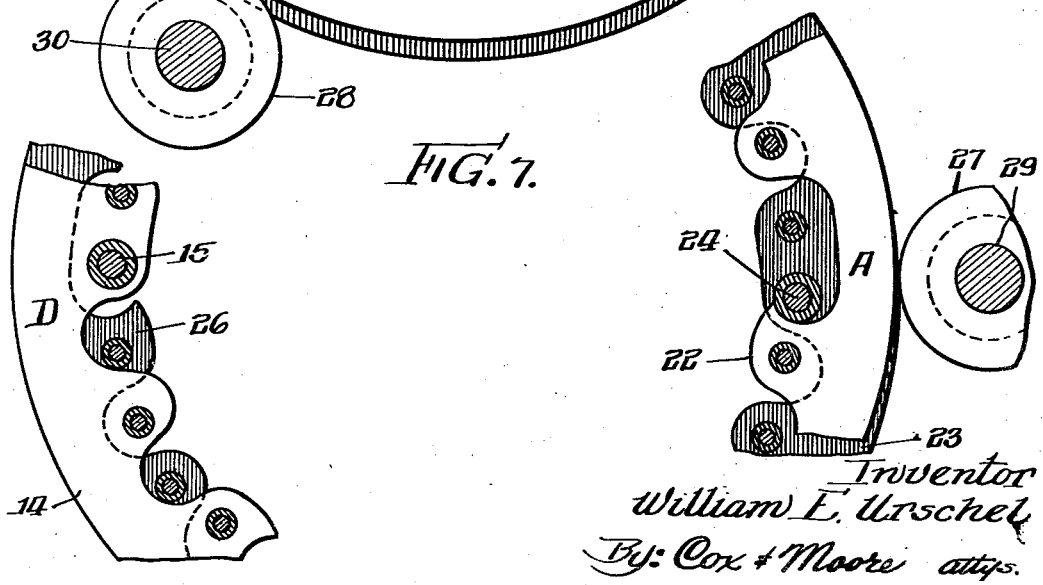
Inventor
William E. Urschel
By: Cox & Moore attys.

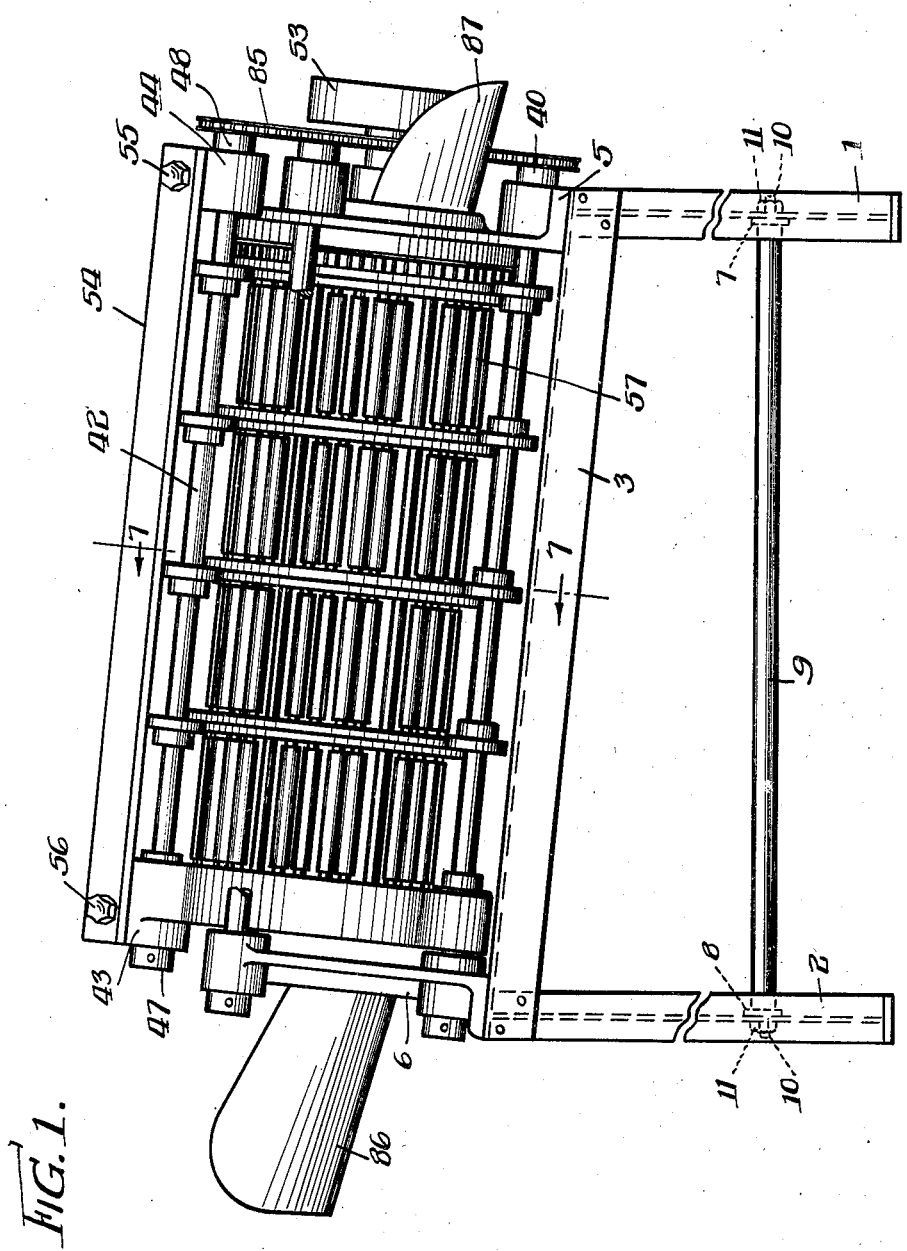

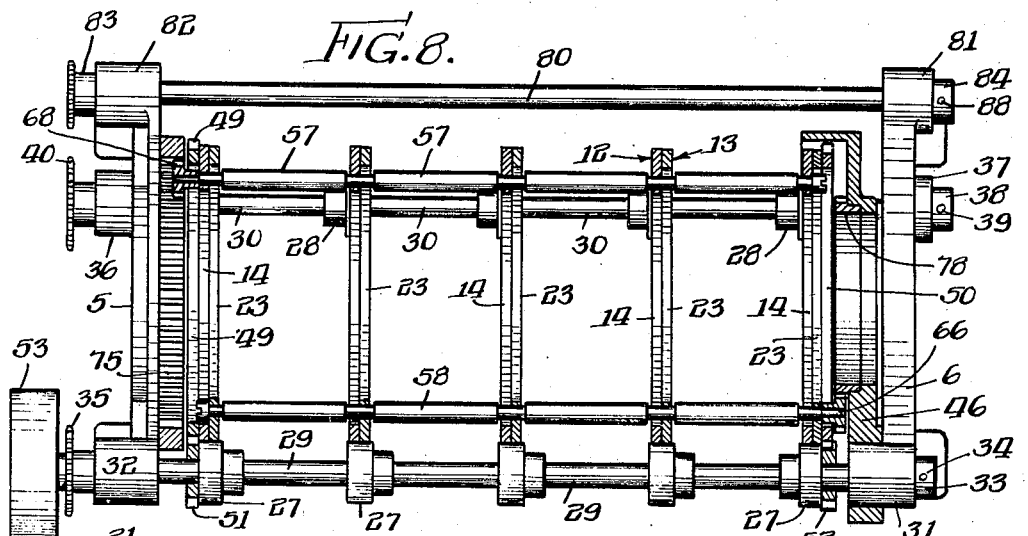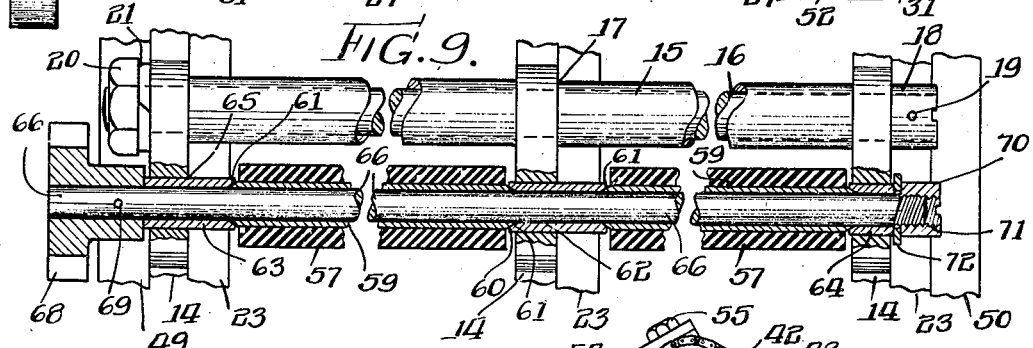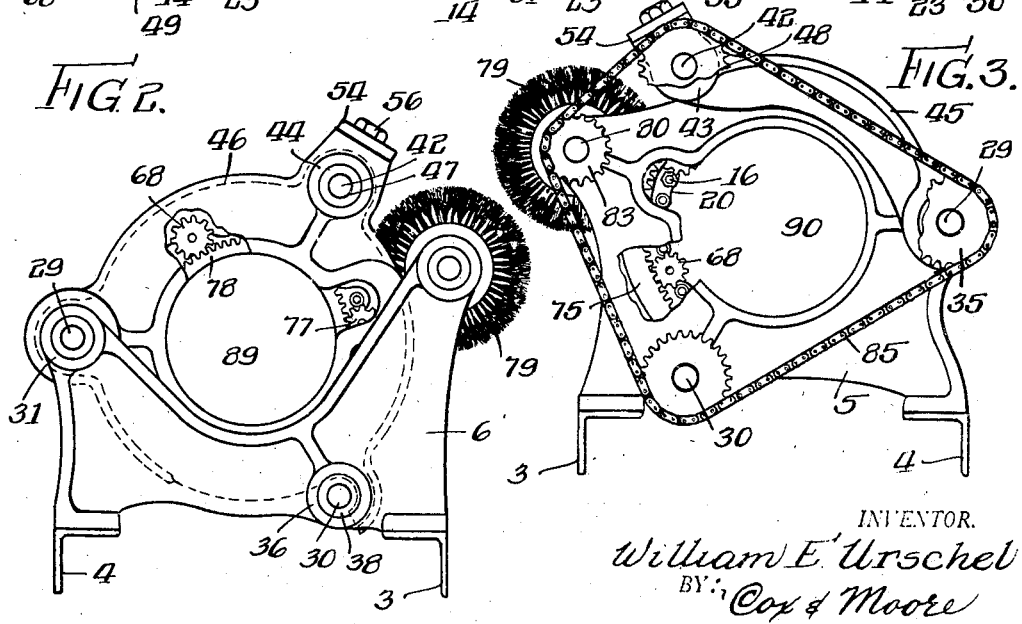

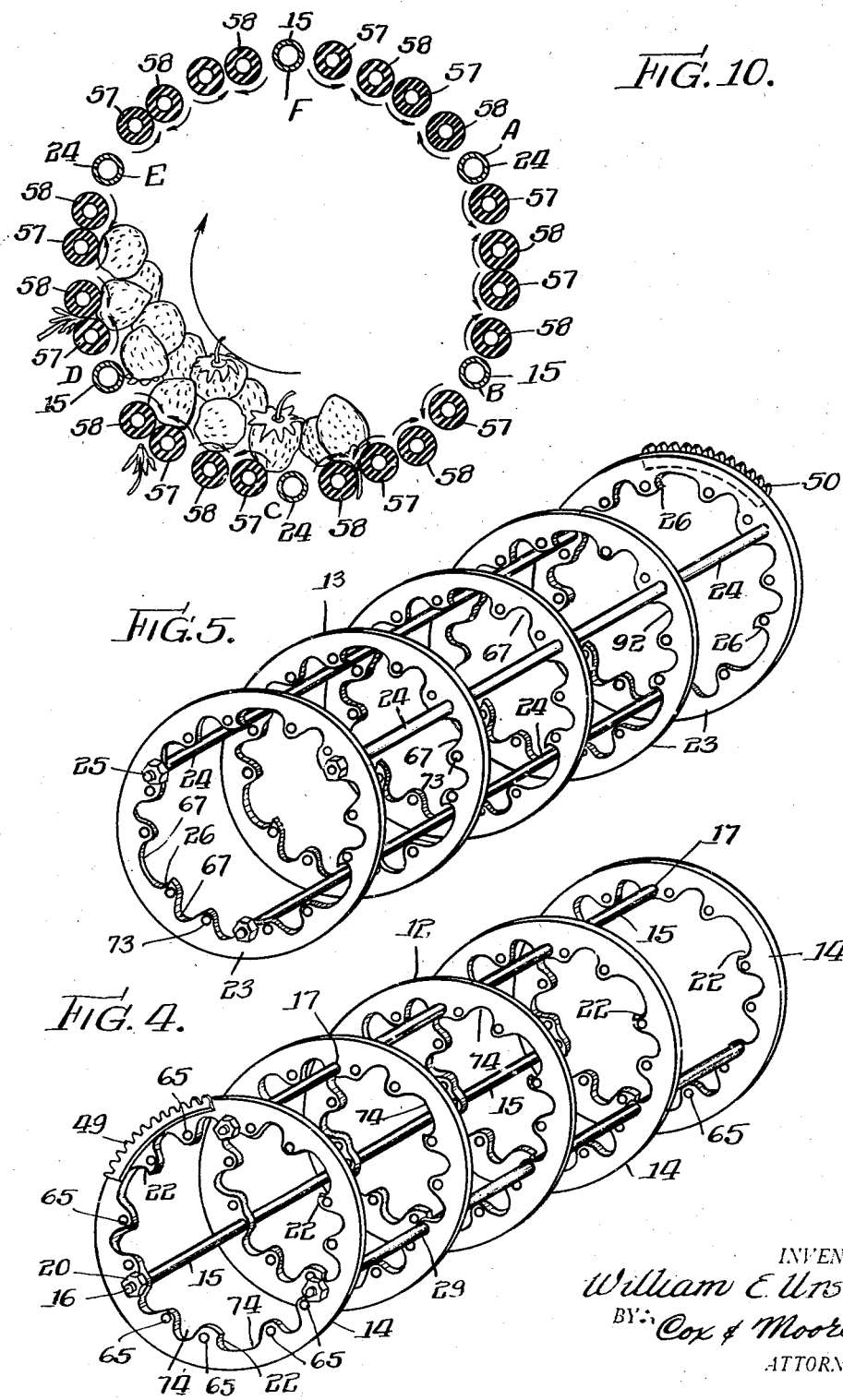

Nov. 21, 1939.    W. E. URSCHEL    2,180,567
FRUIT STEMMER
Filed Feb. 25, 1937    5 Sheets-Sheet 5
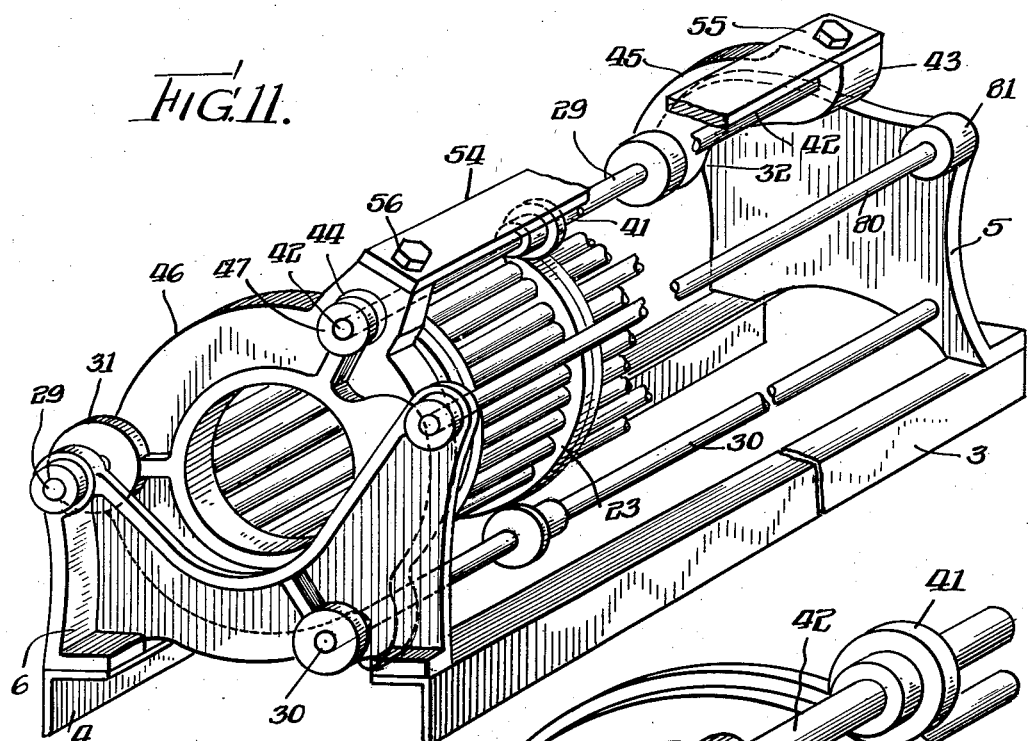
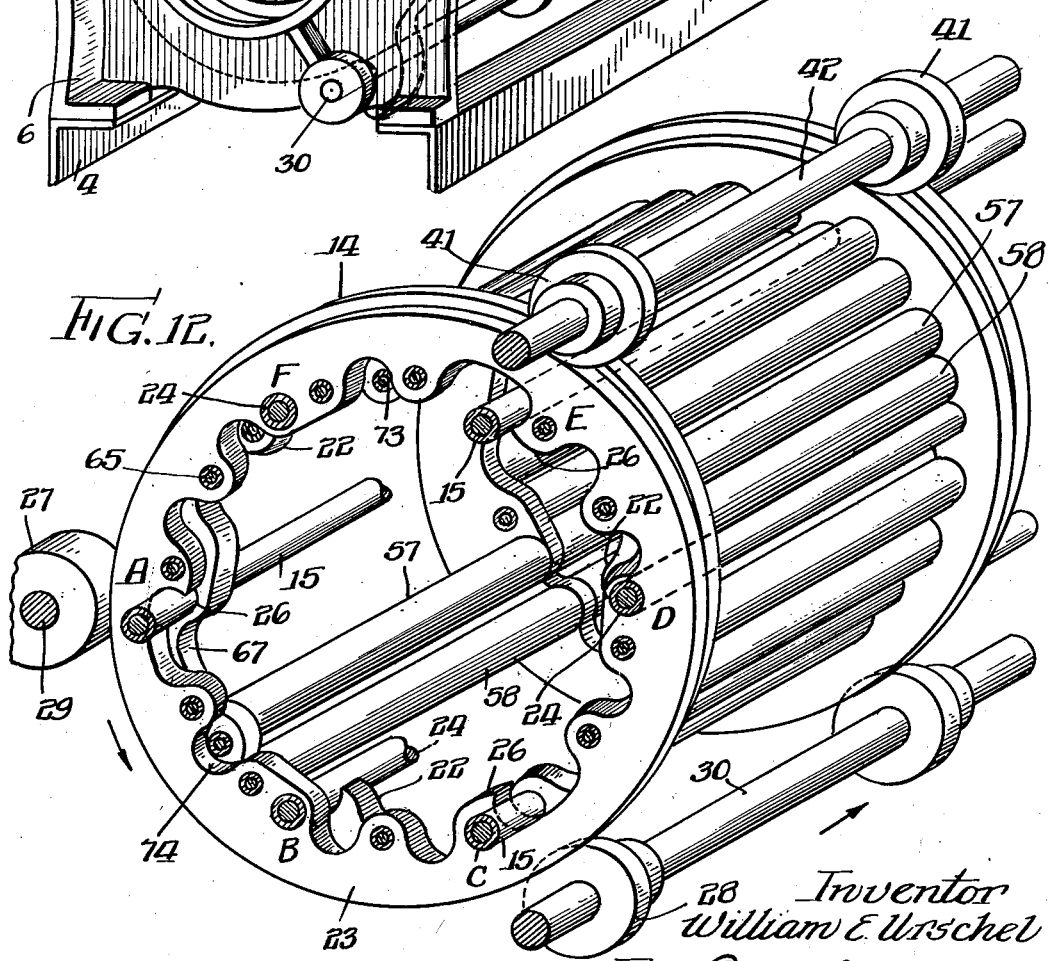
Inventor
William E. Urschel
By: Cox & Moore
Attys Patented Nov. 21, 1939

2,180,567

UNITED STATES PATENT OFFICE 2,180,567

FRUIT STEMMER

William E. Urschel, Valparaiso, Ind.

Application February 25, 1937, Serial No. 127,647

22 Claims. (Cl. 146—55)

This invention relates to a method and apparatus for removing the stems from fruit, and more particularly, but not by way of limitation, to a method and process which removes the stems and leaves from strawberries, cherries, plums and the like.

An object of the invention is to remove stems from fruit by continually shifting the fruit to position the stems into the openings between cooperating rollers.

A further object of the invention is to provide a stemming machine which will remove stems from fruits by varying the pressure between cooperating rollers, between which the stems of the fruit have been positioned.

A further object of the invention is to provide an apparatus which removes stems from fruits and the like with means for continually shifting the fruit to position the stems into openings between cooperating rollers which are mounted on the shifting means.

A further object of the invention is to provide an apparatus which removes stems from fruits and the like with rotating cylinders for continually shifting the fruit to position the stems into openings between cooperating rollers mounted on the cylinders, and means on the cylinders for applying pressure between the rollers.

A further object of the invention is an apparatus for stemming fruit and the like by shifting the fruit in a plurality of rotating cylinders having rollers for stemming the fruit which can be individually removed from the apparatus.

Numerous other objects and advantages will more fully appear during the course and progress of the following specification.

The accompanying drawings illustrate a selected embodiment of the invention and the views therein are as follows:

Fig. 1 is a side elevation of the apparatus;

Fig. 2 is an elevation of the feed end of the apparatus with the supporting frame and the feed hopper removed;

Fig. 3 is an elevational view of the discharge end of the apparatus, with the discharge chute, drive pulley and supporting frame removed;

Fig. 4 is an enlarged perspective of one of the interlocking fruit-carrying cylinders, with the stemmer rolls removed;

Fig. 5 is an enlarged perspective of the second fruit-carrying cylinder, with the stemmer rolls removed;

Fig. 6 is an exaggerated sectional elevation taken on line 7—7 of Fig. 1, showing the action of the cylinders at various circumferential positions;

Fig. 7 is a view similar to Fig. 6, showing part of the cylinder being revolved 60° from the position of Fig. 6;

Fig. 8 is a sectional plan view of the fruit-carrying cylinder and drive therefor, with some of the stemming rolls removed from the cylinder;

Fig. 9 is an enlarged fragmentary sectional view of the stemmer roll assembly, with a detail showing of the stemmer roll supporting ring spacers and connecting bearings;

Fig. 10 is a diagrammatic section of the fruit-carrying cylinders, illustrating the process of stemming the fruit;

Fig. 11 is a perspective view of some of the mechanism taken from the feed end of the apparatus, showing the means for disaligning the cylinders; and Fig. 12 is a perspective view of part of the cylinders, showing the interconnection of the rings after disalignment.

Referring, now, to the drawings which illustrate the preferred embodiment of the invention, the apparatus has a supporting frame consisting of complementary forward and rearward legs 1 and 2, which are riveted to the extremities of two longitudinal frame members 3 and 4, and held in spaced relation by the bracket end members 5 and 6 (see Fig. 1). Longitudinally extending straps 7 and 8 serve to space the lower extremities of the legs 1 and 2. The machine is provided with additional rigidity by the tubular spacers 9, cooperating with the tie-rod 10 and nuts 11. The legs 1 and 2 have complementary legs (not shown) for supporting the machine. The front leg 1 and its complementary leg (not shown) are of a length shorter than that of the rear legs. This shortening of the front legs with respect to the rear legs causes the frame to have an inclination (see Fig. 1), for the purpose of providing an inclination to the stemming mechanism to be supported, the purpose of which will be hereinafter described.

The fruit-carrying drum consists of two cooperating cylinders 12 and 13, shown in Figs. 4 and 5. Cylinder 12 is comprised of a plurality of annuluses or rings 14 (see Fig. 9), held in spaced relationship to each other by three tubular spacers 15. The spacers 15 are mounted on tie-rods 16, extending through the apertures 17 in the body of the annular rings 14. The tie-rods 16, extending through the rings 14 and carrying the spacers 15, are prevented from longitudinal displacement at one end by a collar 18 and cooperating pin 19 adjacent an end ring 14. At the other end the tie-rod is held by a nut 20 threaded on the tie-rod and held in position by a lock nut 21. The annuluses 14 have three inwardly extending hooked portions 22 disposed around the inner periphery of the ring 14 (see Fig. 4). The hooks and shafts are spaced alternately between each other a distance of 60° (see Fig. 4). The second cylinder 13 is identical in construction with cylinder 12 and contains a plurality of annuluses or rings 23 held in spaced relation by three tubular spacers 24, mounted on the tie-rods 25, in exactly the same manner as cylinder 12. The rings 23 of the cylinder 13 have hooked portions 26 disposed around the inner periphery of rings 13, in the same manner as the hooks 22 of the rings 14, except that they are arranged in an exact reverse position (see Fig. 5). This is accomplished by turning a ring 23 around so that it is arranged in exact opposite relaton to a ring 14. The hooks 26 and shafts 24 of the rings 23 are alternately spaced 60° apart, as on rings 14. It is to be noted that by the opposite arrangement of the rings the disposition of the hooks 26 and spacers 24 is varied or offset 60° from the hooks and spacers on the rings 14. This is for the purpose of having the hooks on one cylinder juxtapositioned to the spacers on the other cylinder, and vice versa.

The two cylinders 12 and 13 are interfitting, as is clearly shown by Figs. 6, 8 and 12. The rings 14 of the cylinder 12 are supported by a plurality of fixed rollers 27 and 28, transversely mounted on shafts 29 and 30, respectively. The shaft 29 is journalled in the bearings 31 and 32 (Fig. 8), which are an integral part of the end members 6 and 5, respectively. The shaft 29 is held in position against longitudinal displacement at one end by a collar 33 and pin 34 and at the other end by a sprocket 35, pinned in any convenient manner to the end of the shaft adjacent the bearing 32. The shaft 30, carrying the rollers 28, is journalled in the bearings 36 and 37 of the end members 5 and 6, respectively. The shaft is positioned at one end by a collar 38, which is pinned at the extremity of the shaft by a pin 39, and at its other end the shaft has a sprocket 40 pinned to the shaft in any conventional manner (not shown) adjacent the bearing 36.

The rings 23 of the cylinder 13 are positioned by the fixed rollers 27 and movable rollers 41. The rollers 41 are mounted on a transverse extending shaft 42, journalled in the bearings 43 and 44, integral with arm 45 and supporting member 46, respectively (see Figs. 2, 3 and 11). The shaft 42 (Figs. 2 and 3) is positioned against longitudinal displacement at one end by a collar 47, pinned to the end of the shaft in any conventional manner, and its other end has a sprocket 48 pinned to the shaft 42 adjacent the bearing 43. The mounting of the two cylinders 12 and 13 is such that each ring 14 of the cylinder 12 is immediately adjacent or flush with its respective ring 23 in the cylinder 13 (see Figs. 8 and 12). The cylinders, upon rotation, are interlocked, as is clearly shown in Figs. 6 and 12, and will be hereinafter described.

The annular rings 23 of the cylinder 12 are floating rings, since they are moved by the rollers 41 mounted on the shaft 42, journalled in the movable supports 45 and 46, to be hereinafter described. The cylinder 13, by this floating action, is caused to become eccentric or out of alignment with respect to cylinder 12, which eccentric positioning of the cylinders with respect to each other and upon rotation, causes the hook 26 of the cylinder 13 to pivot about the respective spacer 15 of the cylinder 12, to be hereinafter explained. At one end of the cylinder 12, adjacent an end ring 14 (see Fig. 4) is an annular gear 49, attached to the ring 14 in any conventional manner. An annular gear 50 (Fig. 5) is attached in any conventional manner to end ring 23 of the cylinder 13, the gear 50 being disposed adjacent the ring 23 at the end opposite the disposition of the gear 49 (see Fig. 8).

The shaft 29 is the main drive shaft and has attached at one end adjacent the end roller 27 a pinion gear 51 (Fig. 8), meshing with the annular gear 49 of the cylinder 12. At the opposite end of the shaft 29, adjacent an end roller 27 is a pinion gear 52, meshing with the annular gear 50 of the cylinder 13. The shaft 29 has secured at one end adjacent the sprocket 35 a drive pulley 53 which rotates the shaft 29 by means of a motor or any other form of motive power (not shown). The rotation of the shaft 29 causes the cylinders 12 and 13 to rotate in a clockwise direction.

The arm 45 is pivotally mounted upon the extended portion of bearing 32 (see Fig. 11), which supports the shaft 29. At the other end of the apparatus the support member 46 is pivotally mounted upon the extended portion of the bearing 31 to pivot around the shaft 30. A transverse strap 54 is secured to the arm 45 and support member 46 by means of screws 55 and 56 (Fig. 1). The strap 54 serves as a means for securing the arm 45 and supporting member 46 for integral movement about the axis of the shaft 29. The members 45 and 46 keep the rollers 41, carried by the shaft 42, in constant contact with the rings 23 of the cylinder 13 (see Figs. 11 and 12). The weight of the arm 45 and the supporting member 46 is transmitted through the rollers 41 to the rings 23, and in addition with the weight of the cylinder itself causes the cylinder 13 to drop downwardly out of alignment with the cylinder 12. (Fig. 6.)

The cylinders 12 and 13 have mounted thereon resilient stemming rolls 57 and 58, respectively (see Figs. 8, 9 and 12). Considering cylinder 12 and ring 14 (Fig. 9), the individual stemming rolls 57 are positioned circumferentially between the annular rings 14 and are secured to a non-resilient core 59. These cores 59 have externally beveled extremities 60 which fit into the internal beveled extremities 61 of bearing sleeves 62, 63 and 64, journalled in the circular apertures 65 of the annular rings 14. The cores 59 and roll 57 are mounted upon a transverse extending shaft 66, extending through the bearings in the apertured portions 65 in the plurality of annular rings 14. It will be understood that due to the identical construction of the rings that equivalent cores 59, bearings 62, 63 and 64, and shafts 66 are carried by the rings 23 for supporting the stemmer rolls 58 of the cylinder 13. The bearings 62, 63 and 64 are journaled in the aperture 73 of the rings 23. The apertures 65 and 73 are alike but are offset with respect to each other because of the opposite arrangement of the rings, heretofore explained.

It is to be noted that each ring of the respective cylinders has twelve apertures on the inner periphery of the ring, and for every aperture a shaft 66, carrying a stemmer roll is inserted therein. Also adjacent each aperture 65 is a recess portion 74 for receiving the stemmer rolls 58 of rings 23. The recess portions adjacent the apertures 65, through the hook portions 22, are larger because they must also receive the spacer shafts of the rings 23, in addition to the stemmer rolls.

The bearing sleeves 63 and 64 carry the rods 66 at each extremity of the roll assemblies, while the bearing sleeves 62 carry the rods in the intermediate rings (see fragmentary Fig. 9). It is to be understood that the bearing sleeves 62, extending through the apertures 65 of the rings 14, extend through the recessed portions 67 of the ring 23 (Fig. 5) to prevent any contact with the ring 23.

At one extremity of the rod or shaft 66 is a pinion 68 pinned to the shaft by the pin 69, and at the opposite end the shaft has a slotted nut 70 cooperating with an end threaded portion 71 of said rod 66, and a lock washer 72 bearing against the end sleeves 64 to provide means for securing the rolls 57, core 59 and sleeves 62, 63 and 64 in such a manner as to prevent any rotative displacement upon the shafts 66. The bearing sleeves extend through the apertures 65 in sufficient length to provide longitudinal clearance which permits the roll assembly to rotate freely between the rings 14.

The stemming rolls 58, carried intermediate the rings 23, are assembled in the cylinder 13 in identically the same manner as the stemming rolls 57, but are displaced or offset circumferentially with respect to rolls 57 by having the bearing sleeves extending through apertures 73 in axial alignment with the circumferentially disposed recesses 74 on the inner periphery of the ring 14. The rings 23 have the plurality of recesses 67 adjacent the apertures 73, in axial alignment with apertures 65 on rings 14. This offset peripheral arrangement of the stemming rolls for the cylinders 12 and 13 provides a plurality of rolls where a roll in one cylinder is juxtapositioned to a roll on the other cylinder, as is clearly shown in Figs. 1, 10 and 12.

The juxtapositioned rollers have a normal clearance between them before the cylinders are disaligned. This clearance is dependent upon the distance between the mean axis of a respective aperture carrying the roller shafts and the mean axis of the adjacent recess which allows the stemmer roll to extend through a ring. The diameter of the stemming rolls is relative to this distance, since it will be obvious that the diameter of the rolls is less than this distance to allow for the normal clearance.

The pinion 68, pinned at one end of the shaft 66 for the stemmer roll 57, meshes with the internal stationary gear 75, mounted in any convenient manner adjacent the end casting 5 (see Figs. 3 and 8). Each individual shaft for the stemmer rolls 57 has a pinion 68 which contacts the gear 75 for rotating the stemmer shafts 66 and their rolls 57, upon rotation of the cylinder 12. The drive shafts 66 (see Fig. 8) for the stemmer rolls 58, have pinions 77 disposed on the end of each shaft and at a position opposite the end to which the pinion 68 is disposed. These pinions 77 mesh with a ring gear 78, mounted upon the movable support 46 in any convenient manner (see Figs. 2 and 8). Each stemmer roll assembly 58 has a pinion 77 and upon rotation of the cylinder 13 the pinion contacts the ring gear 78 to impart rotation to the stemmer rolls 58. The rotation of the cylinders 12 and 13 causes the simultaneous rotation of the stemmer rolls 57 and 58, mounted upon the cylinders. The rollers 57 and 58 rotate oppositely, or clockwise and counter-clockwise, because the pinions for one set of rolls are meshing a gear having external teeth, while the pinions for the other set of rolls are meshing with a gear having internal teeth.

A brush 79 is secured to a transversely extending shaft 80 (Figs. 2 and 3). The shaft 80 is journalled in the bearings 81 and 82 (Fig. 8), which are an integral part of the end members 6 and 5, respectively. The brush 79 is rotatable with the shaft 80, for the purpose of removing any stems, leaves or other refuse from the outer periphery of the interlocking fruit-carrying cylinders 12 and 13.

One end of the shaft 80 carries a sprocket 83 mounted in any convenient manner, and at the other end the shaft 80 has a collar 84, pinned thereto by the pins 88, to cooperate with the sprocket 83 to longitudinally position the shaft between the end members 5 and 6. A sprocket chain 85, cooperating with the sprockets 40, 48 and 83 (Fig. 3) and the main drive sprocket 35, secured to the shaft 29, serves to drive the brush 79, rolls 41 and 28, respectively. The sprocket 35 and rolls 27 are rotated by the shaft 29, driven by the pulley 53, hereinbefore explained.

A feed hopper 86 is attached to the end section 6 in any convenient manner, and is adapted to receive the fruit for feeding into the aperture 89 on the member 46 at one end of the cylinder assemblies 12 and 13. At the opposite end of the cylinders, the end support 5 has a recess 90 for discharging the stemmed fruit into hopper 87. The hopper is integrally secured to the support 5, in any convenient manner. A spray pipe (not shown) may be attached to the upper section of the cylinders to wash the fruit as it passes through the machine.

*Operation*

The unstemmed fruit is placed in the feed hopper 86, which directs the fruit into the fruit-carrying cylinders 12 and 13, and due to the inclined mounting of the cylinders on the frame, the fruit is tumbled around in the rotating cylinders and the circumferentially disposed stemming rolls mounted thereon. The cylinder 12 is driven by the rollers 27 and 28 and rotates in the same position. The rotation of the floating cylinder 13 by the rollers 27 and 41 causes the roller 41 to transmit the weight of the members 45 and 46, assisted by the weight of the cylinder itself, to drop the floating cylinder 13 out of alignment with the cylinder 12 (see Fig. 12).

The disalignment of the rotating cylinder 13 causes the hooks 26 of the rings 23 to pivot about the shaft 15 of the rings 14 at a position A (see Fig. 6). The pivoting of the hooks upon the shafts at the position A upon disalignment, is due to the disposition of the roller 27 which acts as a stop for the horizontal movement of the cylinder 13, when acted on by roller 41. A hook 26 of cylinder 13 will contact the shaft 15 of the cylinder 12 at the position A to stop the downward movement of the cylinder 12. The rollers 27 and 28 are rotating the cylinder 12 and the rollers 41 and 27 rotate the cylinder 13. The disposition of the rollers 27 intermediate the vertical distance between the rollers 28 and 41, each spaced 120° apart, conforms with the 60° spacing of the respective hooks and shafts of the cooperating cylinders, to cause the shaft 15 of the rotating cylinder 12 to be positioned at the position A to receive the hooks 26 of the cylinder 13. It will be noted that a shaft 24 of cylinder 13 will also contact a hook 22 of cylinder 12 at position A for supporting the cylinder 13, it depending merely upon the rotation of the cylinders. At the position A the pivoting of the hooks 26 about the shaft 15 (Fig. 12) causes the stemmer rollers 57 and 58, adjacent the respective hooks and shafts, to have a clearance. This is due to the circumferential disposition of the stemmer rolls on the respective cylinders which normally have a clearance, as hereinbefore explained. The pivoting of the hooks 26 on the shaft 15 precludes any vertical movement between the cylinders and consequently the stemmer rolls 57 and 58, adjacent this position, substantially maintain their normal clearance.

At the position D, diametrically opposite the position A the shafts 24 of the rings 23 are moved out of contact, or away from the hooks 22 of the rings 14, because the rollers 41 are exerting a downward force against the rings 23 pivoted about the shaft 15 at the position A. At the position D (Figs. 6 and 10) the hooks 22 and shaft 24 have a maximum clearance to create a pressure between the stemming rolls adjacent these respective hooks and shafts. This pressure is created because upon disalignment of the rings 23 by the rollers 41 the rings are caused to move vertically downward at this point D. Consequently the stemmer rolls 58, carried by the rings 23 adjacent the position D, are also moved vertically downward into contact with the stemmer rolls 57 to overcome the normal clearance between the stemmer rolls 57 and 58. This contacting or engagement of the stemming rolls obviously provides a pressure between the adjacent stemming rolls in proximity of this position D.

At the position B the hooks 22 of the rings 14 are near the shafts 24 of the rings 23, but do not quite contact each other. This creates a clearance between the stemming rolls adjacent this position slightly less than that of the stemming rolls at position A (Fig. 6).

At position C the clearance between the hooks 26 of the rings 23 and the shaft 15 of the rings 14 is further increased to further decrease the clearance between the stemming rolls 57 and 58 adjacent this position. A close inspection of Fig. 10 will exemplify this arrangement.

The maximum clearance of the hooks and shafts at position D has been explained supra. At position E the hooks 26 of the rings 23 do not contact the shafts 15 of the ring 14, but the clearance between them is decreased with respect to position D to slightly increase the clearance between the adjacent stemming rolls 57 and 58. The clearance between the hooks 22 of the rings 14 and the shaft 24 of the rings 23 at position F is still less than at position E, to increase the clearance between the stemming rolls 57 and 58 adjacent position F (see Fig. 10).

It will be seen that the effect of the disalignment of the cylinder 13 with respect to cylinder 12 is to create a progressive clearance at various points between the hooks and shafts of the respective cylinders; which simultaneously creates a progressive clearance between the stemmer rolls 57 and 58 at various points along the circumference of the cylinders. It will be apparent that where the hooks and shafts are in engagement with each other the stemming rolls are farthest away from each other. Simultaneously, at the position where the hooks and shafts are farthest from engagement the stemmer rolls adjacent this position are in contact with each other to create a pressure between them.

Between the position A, where there is minimum clearance between the respective hooks and shafts, and the position D where there is maximum clearance, the intermediate positions B and C disclose a progressive increase in clearance between the respective hooks and shafts to provide a progressive decrease in clearance between the stemmer rolls 57 and 58 adjacent these positions. Between the positions D and A the clearance between the respective hooks and shafts at positions E and F is progressively decreased to progressively increase the clearance between the stemmer rolls 57 and 58 adjacent these positions.

The rotation of the cylinders 12 and 13 is constantly moving the respective hooks and shafts on the cylinders. It is to be noted that each cylinder has three hooks and three spacer shafts alternately spaced 60° apart. Also, the spacing of the hooks and shafts in rings 23 is offset or varied 60° with those on rings 14, due to the opposite arrangement of the rings, as hereinbefore explained. The rotation of the cylinder every one-sixth of a revolution will rotate a respective hook and shaft from one position into a different progressive position. It will be understood that the increase or decrease of the clearance between the respective hooks and shafts and also between the stemmer rolls is progressive throughout the entire circumference of the cylinders, due to the constant rotation of the cylinders. In Fig. 7 the hook 22 of the rings 14 and shaft 24 of rings 23, formerly at position F in Fig. 6, have been revolved 60° to allow the shaft 24 of rings 23 to pivot about the hooks 22 of rings 14 at the new position A.

It will be apparent that the rotation of the rings 14 and the disalignment rings 23 will position either a hook or a shaft on the rings 14 at position A to receive a shaft or a hook, respectively, from the rings 23 to create the progressive changes between the stemmer rolls 57 and 58 carried by the rings 14 and 23. Also the 60° circumferential spacing of the hooks and shafts of the respective rings causes the operation to be repeated every one-sixth of a revolution of the rings.

It will be seen that during the shifting of the fruit through the revolving cylinders 12 and 13, the stemming rolls that have a clearance will receive the stems of the tumbling fruit. The clearance created by the disaligned cylinders to allow the stems to enter between the stemming rolls (Fig. 10) is not sufficient to allow any part of the fruit to enter between the stemming rolls, but only the stems. The revolving of the cylinders progressively decreases this clearance between these stemming rolls to create a pressure, and since the stemming rolls are rotating in opposite directions, when the pressure is sufficient, the rolls 57 and 58 will pull the stems from the fruit.

It is evident that the stems and leaves can enter the openings between rolls 57 and 58 with less effort when there is a clearance provided than if the rolls were together under a pressure around the whole periphery of the cylinder. This application of pressure to the stemming rolls is only at the section of the cylinder where the stems are removed, which rolls previously had a clearance to receive the stems. Thereby less motive effort is required to operate the machine than if the rolls were under pressure around the entire circumference of the cylinder. It is also evident that the tumbling of the fruit, caused by the rotation of the cylinders 12 and 13, greatly multiplies the chances of the stems and leaves entering the openings between the stemming rolls 57 and 58. The inclination of the longitudinal axis of the cylinders causes the stemmed fruit to tumble towards the discharging chute 87, which directs said fruit into a suitable receptacle or conveyor.

It will be understood that the term "rollers" as employed in the present specification is not limited to members having a cylindrical periphery, since the surfaces may be variously configurated to preferentially engage the material under treatment. The rollers may in general be said to comprise members adapted to rotate either fully or partially about predetermined axes.

Changes may be made in the formation, construction and arrangement of the parts without departing from the spirit of the invention or sacrificing any of its advantages, and the right is hereby reserved to make all such changes as fairly fall within the scope of the following claims.

What is claimed as new and desired to be secured by Letters Patent of the United States is as follows:

1. In a fruit-stemming mechanism comprising a plurality of rotatable fruit-carrying cylinders, each cylinder comprising a plurality of rollers thereon, such cylinders being associated in interfitted relationship with said rollers adjacently disposed in pairs, means for rotating the cylinders and rollers simultaneously and means for translating the axes of said rollers in a direction toward each other for creating an increased pressure between adjacent rollers for removing the stems of the fruit.

2. In a fruit-stemming mechanism comprising a plurality of rotatable fruit-carrying cylinders, each cylinder comprising a plurality of rollers, such cylinders being associated in inter-fitted relationship with said rollers adjacently disposed in pairs, means for rotating the cylinders, means for rotating the rollers simultaneously, means for creating a pressure between part of the rollers at certain points on the cylinders for removing the stems of the fruit, and simultaneously relatively separating the axes of others of said rollers for creating a clearance between the remaining rollers for receiving the stems.

3. In a stemming mechanism a plurality of rotatable interfitting cylinders, each of said cylinders comprising a plurality of rings arranged in spaced relation, an inclined frame, said cylinders mounted on the frame in interlocking relationship to each other, rollers circumferentially positioned on the cylinders, means for creating a pressure betwen part of the rollers at certain points on the cylinder to provide a clearance for receiving the stems of the fruit rotating in the cylinders, and simultaneously creating a pressure between the rollers at other points.

4. In a stemming mechanism comprising rotatable interfitting cylinders, each of said cylinders consisting of a plurality of rings arranged in spaced relation, rollers circumferentially mounted on each cylinder intermediate the rings, said rollers so positioned on each cylinder to lie circumferentially adjacent a roller on the other cylinder, and means for disaligning the rotating cylinders in a direction generally transversely and toward at least one said adjacent roller to create a pressure between part of the cooperating rollers.

5. In a stemming mechanism comprising rotatable associated cylinders, each of said cylinders consisting of a plurality of rings arranged in spaced relation, rollers circumferentially mounted on each cylinder intermediate the rings, said rollers so positioned on each cylinder to lie circumferentially adjacent a roller on the other cylinder and means for transversely disaligning the rotating cylinders to create a clearance between part of the cooperating rollers.

6. In a stemming mechanism comprising rotatable fruit-carrying cylinders consisting of a plurality of rings arranged in spaced relation, rollers circumferentially mounted on each cylinder intermediate the rings, said rollers so positioned on each cylinder to lie adjacent a roller on the other cylinder and means for transversely disaligning the rotating cylinders to create a pressure in part of the rollers and simultaneously creating a clearance in the remaining rollers.

7. In a device of the class described, the combination of means forming a bed comprising a plurality of adjacently-disposed pairs of resilient rolls, means for feeding fruit to be stemmed onto said bed, means for reversely rotating the rolls of each pair, means for relatively moving the rolls of each pair throughout the extent of the bed and means for causing said rolls while being so moved relatively to approach and recede from each other from a position of a maximum clearance therebetween to a position wherein the roll of each pair press into contact with one another.

8. A fruit-stemming apparatus comprising a moving series of pairs of resilient rolls, means for moving said series of rolls in a closed path of travel, means for feeding fruit thereon to be stemmed, means for producing relative progressive approaching and receding movement between the rolls of each pair to move the same from a separated position into pressure contact with one another, and means for turning the rolls in opposite directions while they are moving whereby to cause the approaching rotating movement of said rolls to grasp the stem of fruit therebetween and to remove the stems therefrom.

9. In a device of the class described, the combination of means forming a closed series of rolls, means for bodily moving the series, means for feeding fruit into the interior of said series, means for rotating certain adjacent rolls of the series oppositely and relatively during their rotation, and means for causing said adjacent rolls progressively to recede from each other and progressively to come into pressure contact with each other during the movement of the rolls as the series of rolls move, and means for causing the approaching movement of said rolls to occur while the fruit is contacting said rolls.

10. In a stemming mechanism comprising rotatable fruit-carrying cylinders consisting of a plurality of apertured rings arranged in spaced relation, rollers circumferentially mounted on each cylinder intermediate the rings, beveled cores for carrying the rollers, said cores adapted to be received by beveled sleeves mounted rotatably in the apertures of the rings, a shaft inserted through the core and the sleeve, and means adjacent either end of the shaft and clamping the cores and sleeves axially together and to the shaft.

11. In a stemming mechanism comprising rotatable fruit-carrying cylinders, comprising a pluality of apertured rings arranged in spaced relation, stemming rollers circumferentially mounted on each cylinder intermediate the rings, a plurality of beveled cores for carrying the rollers, each core adapted to be received by a beveled sleeve mounted rotatably in an aperture of the rings, a shaft inserted through the core and the sleeve, and clamping means at one end of the shaft to insure rotation of the shaft, the sleeves and the rollers together.

12. In a fruit-stemming mechanism comprising an inclined frame, a plurality of interlocking fruit-carrying cylinders carried by the frame, each cylinder comprising a plurality of rings arranged in spaced relation, a plurality of rollers for rotating the cylinders, a plurality of stemming rolls circumferentially mounted on each cylinder intermediate the rings, said stemming rollers so positioned between the rings to lie circumferentially adjacent a cooperating roller on the other cylinder, means for rotating the stemming rollers, means adapted to apply a force to one set of the cylinder-rotating rollers to disalign the cylinders with respect to the other and hook means carried by one cylinder to engage shaft means carried by the other cylinder at certain points on the periphery of the cylinders to create a clearance between part of the stemming rollers and simultaneously creating a pressure between the remaining stemming rollers.

13. In a stemming mechanism a plurality of rotatable interfitting cylinders, each of said cylinders comprising a plurality of rings arranged in spaced relation, rollers positioned circumferentially about the cylinders and attached to the respective rings, said cylinders being in interlocking relationship with rollers on each cylinder in adjacent relationship to provide generally circumferentially arranged pairs of rollers, said cylinders being relatively disaligned about a substantially fixed point adjacent the periphery thereof, means to rotate said cylinders in said disaligned paths, the pairs of rollers adjacent the fixed point having a predetermined separation whereby upon rotation the pairs of rollers tend to progressively approach and then separate whereby to grasp the stems and subsequently to release them.

14. In a stemming mechanism a plurality of rotatable interfitting cylinders, each of said cylinders comprising a plurality of rings arranged in spaced relation, rollers positioned circumferentially about the cylinders and attached to the respective rings, said cylinders being in interlocking relationship with rollers on each cylinder in adjacent relationship to provide generally circumferentially arranged pairs of rollers, the said cylinders being so constructed as to provide a predetermined clearance between each pair of rollers when the cylinders are arranged in alignment, said cylinders being relatively disaligned about a substantially fixed point adjacent the periphery thereof, the rollers of each pair having a predetermined separation in the vicinity of said fixed point, the degree of disalignment being such that at a point on the periphery of said cylinders substantially opposite the said fixed point the adjacent pairs of rollers are forced together with a predetermined maximum pressure, and means to rotate said cylinders in said disaligned paths whereby during rotation the pairs of rollers tend to approach and then to separate whereby to grasp and release the stems of the material to be treated, and means to rotate the rollers to draw the stems out of the material.

15. In a stemming mechanism comprising a plurality of rotatable fruit-carrying frames, rotating means positioned on the frames for removing the stems of the fruit, such cylinders being associated in inter-fitted relationship with said rotating means adjacently disposed in pairs and means for relatively varying the distance between the axes of said rotating means for controlling the spacing of the rotating means, said last described means being operable to separate the rotating means to accommodate the stems therebetween and to bring the axes of said rotating means together for gripping the stems so accommodated.

16. In a stemming mechanism comprising rotatable fruit-carrying cylinders, each of said cylinders consisting of a plurality of rings arranged in spaced relation, rollers circumferentially mounted intermediate the rings and adjacent the outer periphery thereof for removing the stems of the fruit, the cylinders being arranged in interfitting relationship with the rollers in substantially parallel relationship, each of the rollers on one of the cylinders being arranged in juxtaposition to a roller on the other cylinder and being generally coextensive therewith, and means to rotate the cylinders about the axes spaced so that the rollers relatively separate from each other at one point and approach each other at a spaced point in their paths of rotation for grasping the stems therebetween.

17. In a stemming mechanism comprising a plurality of fruit-carrying members, rotatable means generally circumferentially positioned on the said members, said fruit carrying members being arranged in inter-fitted relationship with said rotatable means in adjacent relationship, said rotatable means being arranged in pairs having generally parallel axes, said pairs of rotatable means being mounted upon said members for rotation in a direction to pull the stems from the fruit, and means for increasing the spacing of said rotatable means and for alternately bringing the axes of each pair relatively closer together whereby to permit the stems of the fruit to alternately extend freely between said rotatable means and to be clamped therebetween for pulling the stems from the fruit.

18. In a stemming mechanism comprising rotatable fruit-carrying cylinders, each of said cylinders consisting of a plurality of rings arranged in spaced relation, rollers circumferentially mounted intermediate the rings and adjacent the outer periphery thereof for removing the stems of the fruit, the cylinders being arranged in interfitting relationship with the rollers in substantially parallel relationship, each of the rollers on one of the cylinders being arranged in juxtaposition to a roller on the other cylinder and being generally coextensive therewith, and means for supporting said cylinders for rotation about spaced axes whereby to cause said rollers to approach and recede as the cylinders are rotated.

19. A fruit stemming mechanism comprising a plurality of relatively movable means arranged in pairs for carrying substance thereon, said means being rotatable about generally parallel axes to pull stems from the substance, said means being spaced whereby they are capable of receiving the stems of the substance therebetween, means for moving said relatively movable means of each pair in a different closed path wherein the axes of the relatively movable means approach each other to reduce the clearance therebetween and to bring said relatively movable means into pressure contact with said stems for removing the stems the substance, further movement in said closed path returning said movable means to said relatively spaced position.

20. In a stemming mechanism comprising a plurality of rotatable stem grasping means adapted to engage the stems of substance placed thereon and to pull the stems from the substance, driving means having operative connection with said rotatable stem grasping means for relatively rotating said last-named means in a direction to remove the stems from the fruit, said stem grasping means being mounted for relative movement bodily in a path to vary the spacing between the axes of said means, means having operative connection to said driving means for periodically relatively moving the stem separating means in said path to a relatively spaced position to accommodate the stems therebetween and for returning the same in said path in a direction toward each other for bringing the said stem grasping means into pressure contact with said stems.

21. In a stemming mechanism comprising a plurality of stem grasping means adapted to engage the stems of substance placed thereon, at least one of said grasping means being rotatable to pull the stems from the substance, driving means having operative connection with said rotatable stem grasping means for relatively rotating said last-named means in a direction to remove the stems from the fruit, said rotatable stem grasping means being supported in journal means and said journal means being mounted upon frame means for relative movement to vary the spacing between the respective stem grasping means, said journal means also having operative connection to a driving means for periodically relatively moving the stem grasping means in said path to a relatively spaced position to accommodate the stems therebetween and for returning the same in said path in a direction toward each other for bringing the said stem grasping means into pressure contact with said stems.

22. A stemming mechanism comprising a rotatable substance-carrying frame having a plurality of movable stem grasping members mounted thereon, a second substance carrying frame having cooperating stem grasping members adapted to be inter-fitted with said first-named frame with the respective stem grasping members in adjacent position to grasp the stems of substance therebetween, means supporting said first-named frame for rotation in a predetermined path, and means associated with said frames for supporting the second-named frame relatively loosely upon said first-named frame in said inter-fitting relationship for rotation with said first-named frame but about a relatively displaced axis of rotation whereby said respective stem gasping means relatively approach and recede from each other during rotation for grasping stems therebetween.

WILLIAM E. URSCHEL.

CERTIFICATE OF CORRECTION.

Patent No. 2,180,567. November 21, 1939.

WILLIAM E. URSCHEL.

It is hereby certified that error appears in the printed specification of the above numbered patent requiring correction as follows: Page 4, second column, line 39, for "disalignment" read disaligned; page 5, second column, line 70, claim 11, for "pluality" read plurality; page 6, second column, line 72, claim 19, after "stems" insert from; and that the said Letters Patent should be read with this correction therein that the same may conform to the record of the case in the Patent Office.

Signed and sealed this 16th day of January, A. D. 1940.

Henry Van Arsdale,
(Seal) Acting Commissioner of Patents.